US008534141B2

(12) United States Patent
Maehara

(10) Patent No.: US 8,534,141 B2
(45) Date of Patent: Sep. 17, 2013

(54) POWER STEERING DEVICE

(75) Inventor: Hideo Maehara, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 300 days.

(21) Appl. No.: 12/924,000

(22) Filed: Oct. 20, 2010

(65) Prior Publication Data
US 2011/0088488 A1   Apr. 21, 2011

(30) Foreign Application Priority Data
Oct. 21, 2009 (JP) .................................. 2009-242166

(51) Int. Cl.
*G01L 3/02*   (2006.01)
(52) U.S. Cl.
USPC ...................................... 73/862.333
(58) Field of Classification Search
USPC ...................... 73/862.331–862.333
See application file for complete search history.

(56) References Cited

U.S. PATENT DOCUMENTS

| | | | | |
|---|---|---|---|---|
| 6,046,583 | A * | 4/2000 | Ayres et al. | 324/146 |
| 7,174,795 | B2 * | 2/2007 | Feng et al. | 73/862.332 |
| 7,188,533 | B2 * | 3/2007 | Pattok et al. | 73/799 |
| 7,391,209 | B2 * | 6/2008 | Asano | 324/207.25 |
| 7,639,004 | B2 * | 12/2009 | Islam et al. | 324/207.25 |
| 7,954,389 | B2 * | 6/2011 | Maehara | 73/862.333 |
| 2009/0241692 | A1 | 10/2009 | Maehara | |

FOREIGN PATENT DOCUMENTS

| | | |
|---|---|---|
| EP | 0-535-422 A1 | 4/1993 |
| EP | 1-688-729 A1 | 8/2006 |
| JP | 2004-271495 A | 9/2004 |
| JP | 2007-240496 A | 9/2007 |
| JP | 2007-271565 A | 10/2007 |
| WO | WO-02/16879 A1 | 2/2002 |

OTHER PUBLICATIONS

Foreign Office Action issued on May 21, 2013.

* cited by examiner

*Primary Examiner* — Max Noori
(74) *Attorney, Agent, or Firm* — Rabin & Berdo, P.C.

(57) ABSTRACT

A vehicle power steering device 1 comprises an input shaft 11, a torque sensor 2 that magnetically detects an input torque input into the input shaft 11, and a position sensor 5 that detects a reference rotation position of the input shaft 11. The position sensor 5 comprises a magnet 52, a first magnetic path forming member 67, 68, 69 that forms a first magnetic loop M for the magnet 52 in the reference rotation position of the input shaft 11, and a magnetic sensing element 56 disposed in the first magnetic loop M. By providing the position sensor 5 with a second magnetic path forming member 67 that forms a second magnetic loop N for the magnet 52 in any rotation position of the input shaft 11 other than the reference rotation position, magnetic flux from the magnet 52 is prevented from leaking to the torque sensor 2.

10 Claims, 7 Drawing Sheets

POWER STEERING DEVICE

FIELD OF THE INVENTION

This invention relates to an arrangement of a position sensor and a torque sensor in a vehicle power steering device.

BACKGROUND OF THE INVENTION

JP2007-240496 A, published by the Japan Patent Office in 2007, proposes a non-contact type torque sensor that detects a steering wheel operation torque that is input into a vehicle power steering device by a driver of a vehicle. Upon sensing the steering wheel operation torque, the power steering device supplements an assisting force of an electric motor to the steering wheel operation torque, thereby accomplishing steering of the vehicle with an input of a small steering wheel operation toque.

The torque sensor comprises a magnetic force generation part which rotates together with an end of a torsion bar in a housing. a rotating magnetic circuit that rotates together with another end of the torsion bar, a stationary magnetic circuit fixed to a housing, and a magnetic force sensing element that detects a density of magnetic flux led to the stationary magnetic circuit.

When the torsion bar undertakes a torsional deformation in response to an input torque, the relative rotation positions of the magnetic force generation part and the rotating magnetic circuit vary As result, a density of the magnetic flux that is led from the magnetic force generation part to the stationary magnetic circuit via the rotating magnetic circuit varies and the magnetic force sensing element outputs a signal indicative of the variation in the magnetic flux.

Further, certain electric power steering devices comprise a rotation position sensor that detects a steering angle of steered wheels of the vehicle from a rotation position of the electric motor, and a position sensor that detects a neutral position of the steering wheel of the vehicle so as to cause a zero point for the measurement of the steering angle to coincide with the neutral position of the steering wheel.

SUMMARY OF THE INVENTION

In view of downsizing or simplifying a power steering device, it is preferable to accommodate the torque sensor and the position sensor in a common housing and integrate circuit boards used for outputting signals from the sensors.

However, when the position sensor is constituted by a magnetic non-contact type sensor, the position sensor and the torque sensor must be arranged in detached places so as to prevent magnetic interference between a magnetic circuit for the torque sensor and a magnetic circuit for the position sensor. It is therefore difficult to share a common circuit board or downsize the housing.

It is therefore an object of this invention to enable an arrangement of the torque sensor in the vicinity of the position sensor without causing magnetic interference.

To achieve the above object, this invention provides a vehicle power steering device comprising an input shaft, a torque sensor that magnetically detects a rotational torque input into the input shaft, and a position sensor that detects a reference rotation position of the input shaft.

The position sensor comprises a magnet, a first magnetic path forming member that forms a first magnetic loop for the magnet in the reference rotation position of the input shaft, a magnetic force sensing element arranged in the first magnetic loop, and a second magnetic path forming member that forms a second magnetic loop for the magnet in a non-reference rotation position of the input shaft.

The details as well as other features and advantages of this invention are set forth in the remainder of the specification and are shown in the accompanying drawings.

DESCRIPTION OF THE PREFERRED EMBODIMENTS

Figure 1:
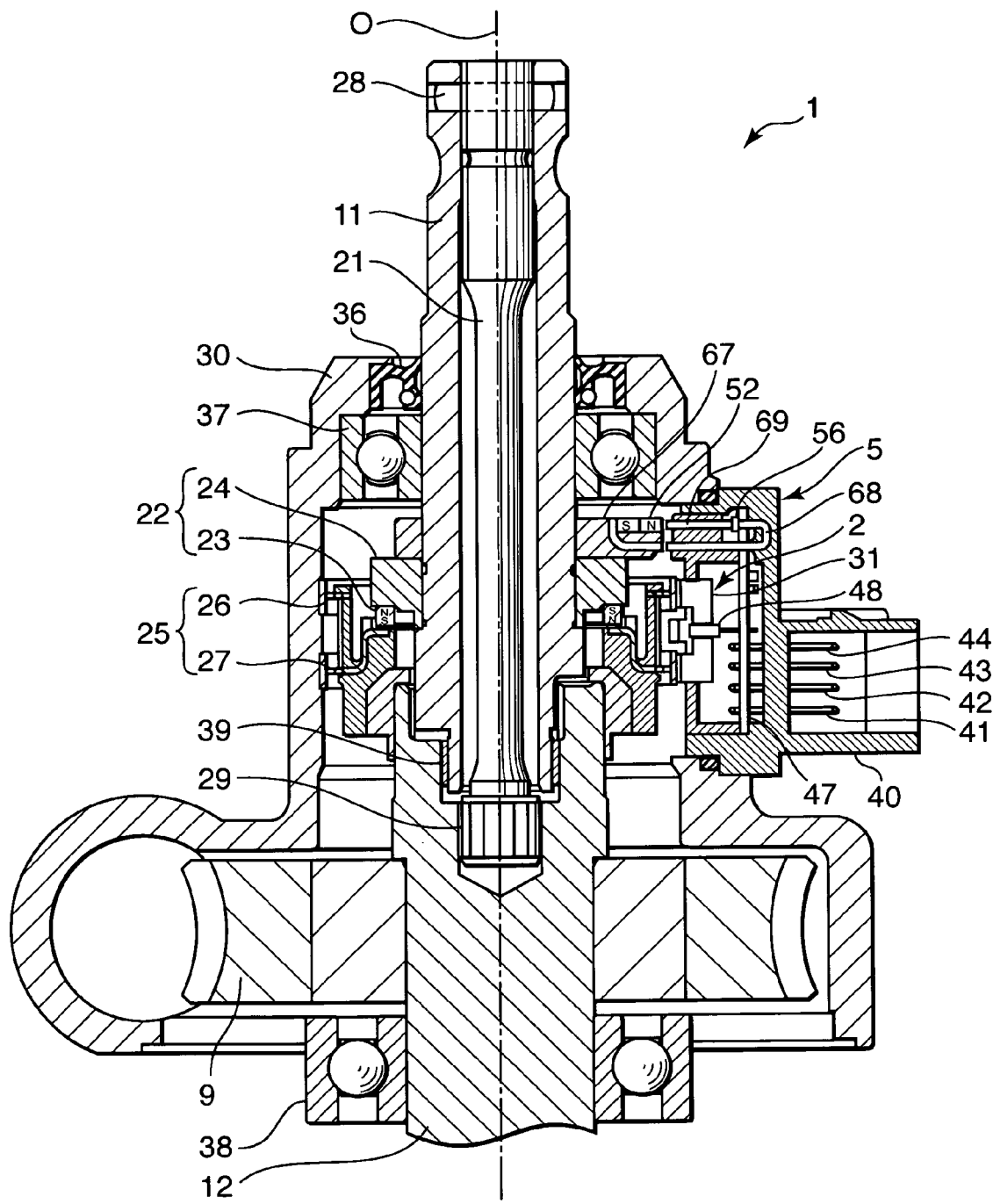
FIG. 1 is a longitudinal sectional view of a power steering device according to this invention.

Referring to FIG. 1 of the drawings, a power steering device 1 for a vehicle comprises an input shaft 11 that rotates in accordance with an operation of a steering wheel performed by a driver of the vehicle, an output shaft 12 that transmits a steering force to steered wheels of the vehicle, and a torsion bar 21 connecting the input shaft 11 and the output shaft 12. The output shaft 12 drives a rack shaft axially via a pinion fixed to a lower end of the output shaft 12, thereby transmitting the steering force to the steered wheels.

A worm wheel 9 is fixed to the output shaft 12. A worm engaged with the worm wheel 9 is driven to rotate by an electric motor 6 shown in FIG. 3, thereby supplementing a torque of the electric motor 6 to the steering wheel operation torque input into the input shaft 11, and a sum torque is output from the output shaft 12 as the steering force.

Figure 3:
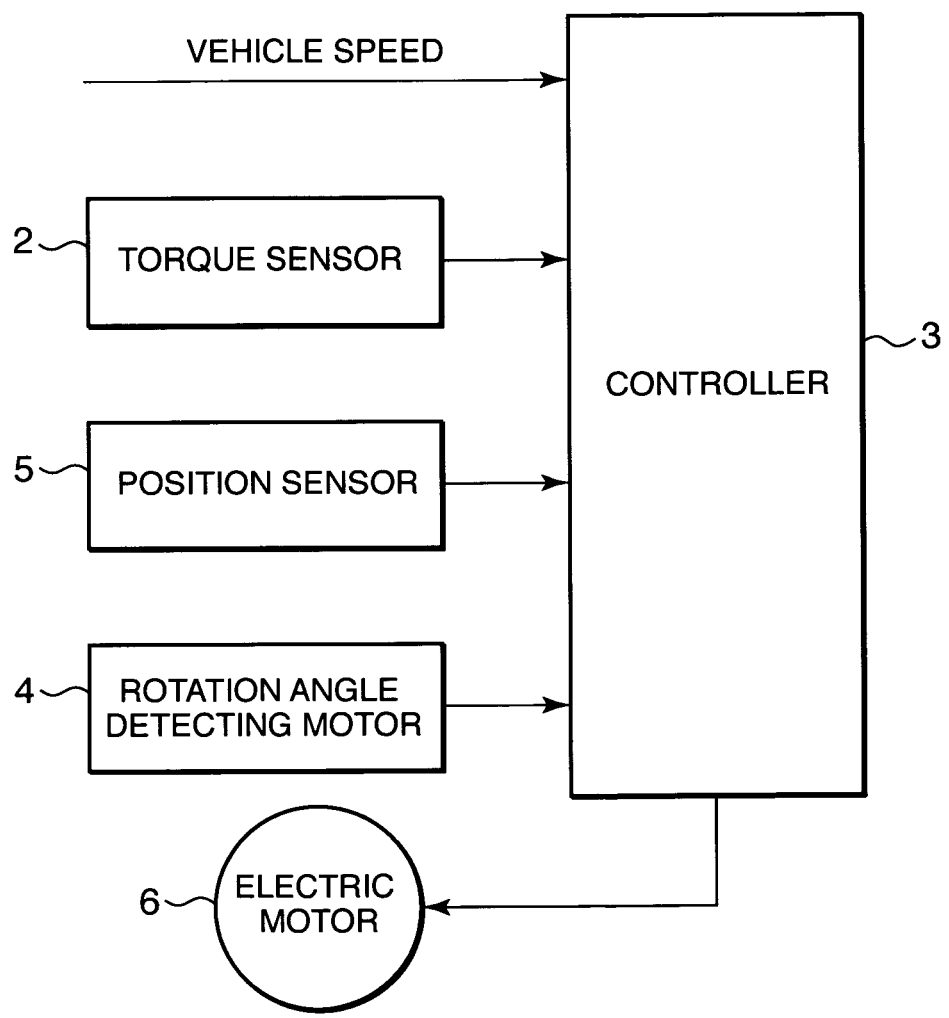
FIG. 3 is a schematic diagram of a control system of the power steering device.

Referring to FIG. 3, operation of the electric motor 6 is controlled by a controller 3.

The controller 3 is constituted by a microcomputer comprising a central processing unit (CPU), a read-only memory (ROM), a random access memory (RAM), and an input/output interface (I/O interface). The controller 3 may be constituted by a plurality of microcomputers.

Data are input into the controller 3 from a torque sensor 2 that detects a steering wheel operation torque input into the input shaft 11, a rotation angle detecting motor 4 serving as a rotation angle sensor that detects a rotation angle of the electric motor 6, and a position sensor 5 that detects a reference rotation position of the input shaft 11 as a signal. The controller 3 controls operation of the electric motor 6 on the basis of a vehicle running condition represented by the above input signals and signals indicative of vehicle running conditions such as a vehicle speed.

The position sensor 5 detects a neutral position of the input shaft 11 as a reference rotation position serving as a zero point for measurement of a rotation angle of the output shaft 12, which is detected by a rotation angle detecting motor 4, or in other words serving as a zero point of a steering angle. The controller 3 calculates a rotation angle of the steering wheel from the neutral position of the input shaft 11 on the basis of signals input from the rotation angle detecting motor 4 and the position sensor 5.

Referring again to FIG. 1, the input shaft 11 is supported by a housing 30 via a roller bearing 37. The output shaft 12 is supported by another housing fixed to the housing 30 via a roller bearing 38. A lower end of the input shaft 11 is connected to an upper end of the output shaft 12 via a roller bearing 39 such that the input shaft 11 and the output shaft 12 are supported to rotate relatively on an identical rotation axis.

A dust seal 36 that slides on the input shaft 11 is provided in the housing 30 so as to keep the housing 30 in a sealed state. The input shaft 11 is formed into a cylindrical shape. The torsion bar 21 is accommodated on the inside of the input shaft 11. An upper end of the torsion bar 21 is connected to the input shaft 11 via a pin 28 and a lower end thereof is connected to the output shaft 12 via a serration 29.

By thus connecting the input shaft 11 and the output shaft 12 by the torsion bar 21, the steering wheel operation torque input into the input shaft 11 is transmitted to the output shaft 12 via the torsion bar 21 while the torsion bar 21 undertakes a torsional deformation in accordance with the steering wheel operation torque.

The torque sensor 2 comprises a magnetic force generation part 22 that rotates together with the input shaft 11, a rotating magnetic circuit 25 that rotates together with the output shaft 12, a stationary magnetic circuit 31 fixed to the housing 30, a magnetic force sensing element 48 that detects a density of the magnetic flux that is led to the stationary magnetic circuit 31, a circuit board 47, and terminals 41-43.

Figure 4:
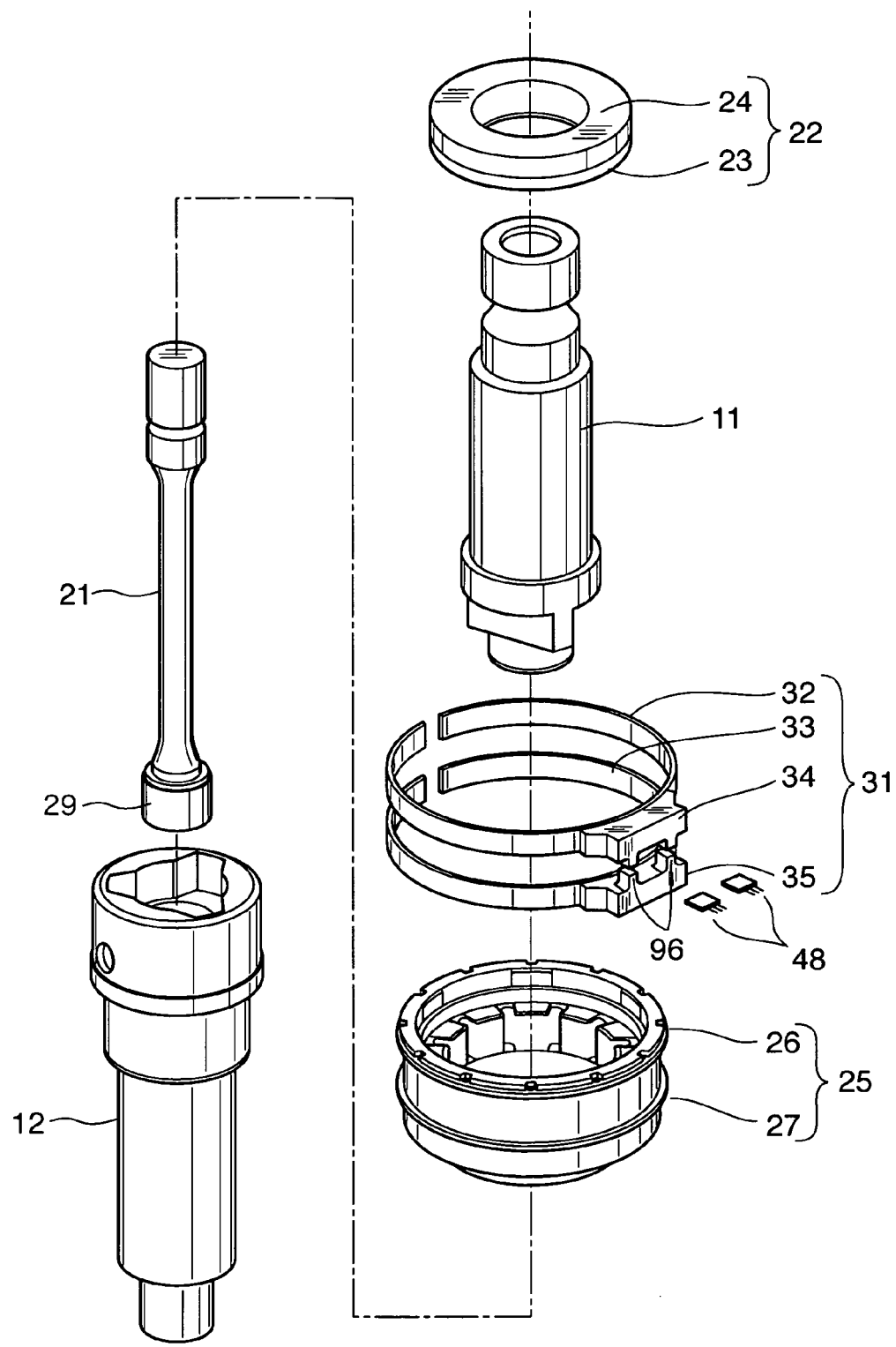
FIG. 4 is an exploded perspective view of the power steering device including a torque sensor.

Referring to FIG. 4, the magnetic force generation part 22 comprises a magnet ring 23 fixed onto the input shaft 11 via a back yoke 24.

Figure 6:
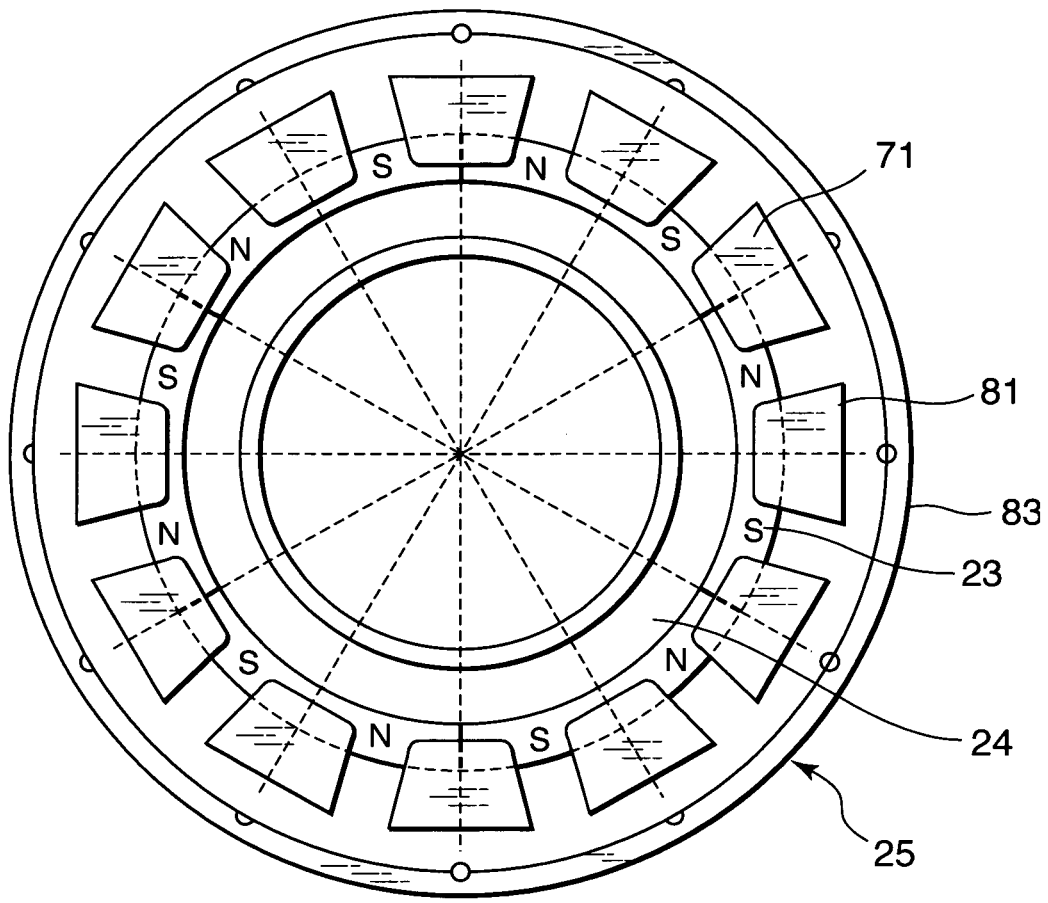
FIG. 6 is a plan view of a rotating magnetic circuit and a magnet ring.

Referring to FIG. 6, the magnet ring 23 is formed by six arc-shaped magnets made from a hard magnetic material. Each of the arc-shaped magnets has a tip magnetized as an N-pole and another tip magnetized as an S-pole. The arc-shaped magnets are arranged such that the N-pole of on magnet and the S-pole of an adjacent magnet abut against each other.

According to this construction, the magnet ring 23 has six N-poles and six S-poles which are disposed alternately around a circle at equal angular intervals.

The back yoke 24 is a cylindrical member formed from a soft magnetic material and press-fitted onto the outer periphery of the input shaft 11. The magnet ring 23 is fixed in advance onto the outer periphery of the lower end of the back yoke 24.

The back yoke 24 functions as a fixing member that fixes the magnet ring 23 onto the input shaft 11 as well as a yoke that transmits magnetic flux between adjacent N-poles and an S-poles. By causing the back yoke 24 to contact the upper surface of the magnet ring 23, the magnetic flux of the magnet ring 23 is concentrated on the lower surface of the magnet ring 23.

It is also possible to provide a fixing member to fix the magnet ring 23 onto the input shaft 11 separately from the back yoke 24 such that the back yoke 24 functions only for transmitting magnetic flux between magnets.

Figure 5A:
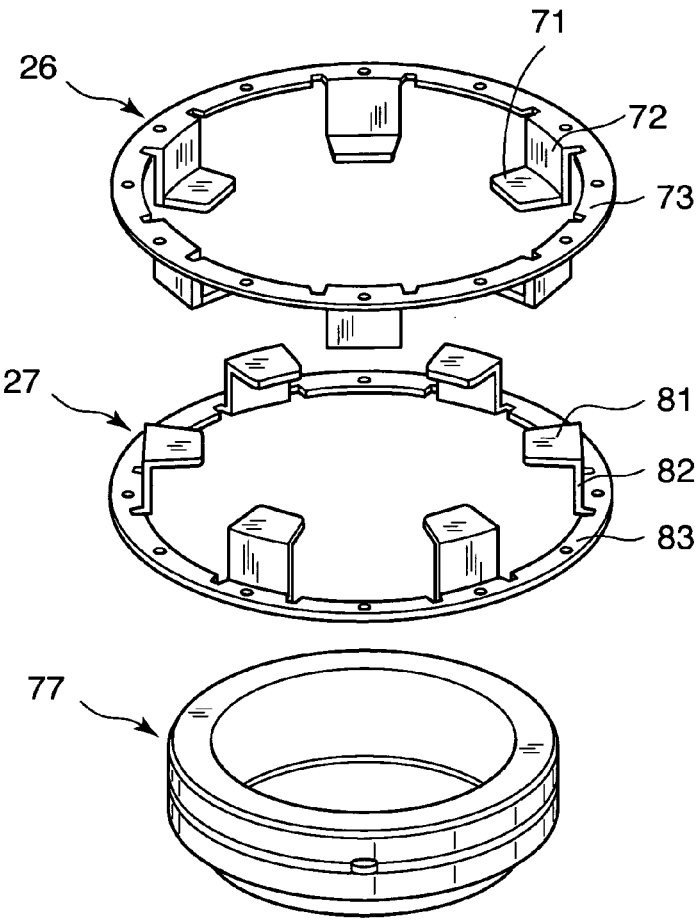
FIGS. 5A and 5B are perspective views of a rotating magnetic circuit in an exploded state and an assembled state.
Figure 5B:
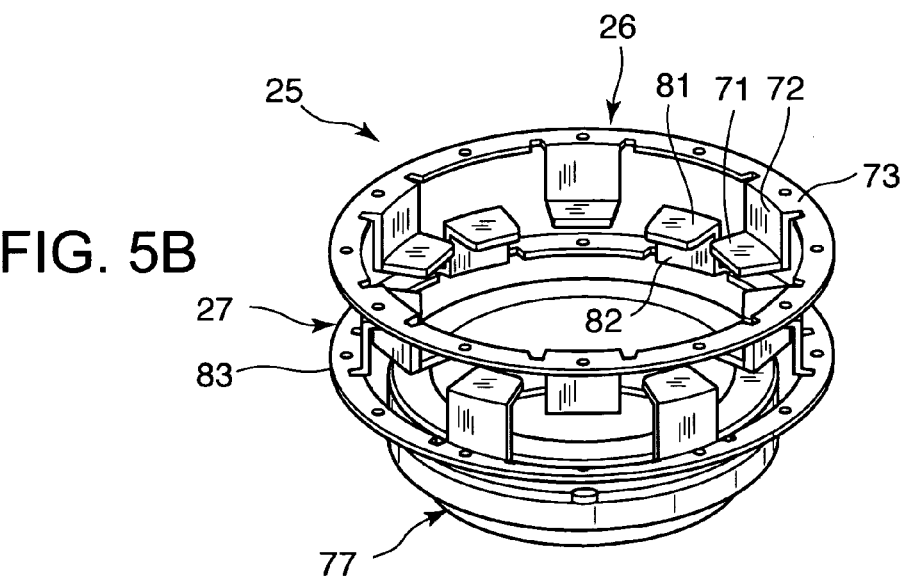

Referring to FIGS. 5A and 5B, the rotating magnetic circuit 25 comprises a first soft magnetic member 26, a second soft magnetic member 27 for receiving the magnetic flux generated by the magnet ring 23, and a fitting member 77 that integrates the first soft magnetic member 26 and the second soft magnetic member 27 into one piece.

The first soft magnetic member 26 comprises a first magnetic ring 73, six first magnetic columns 72 projecting respectively from the first magnetic ring 73 downward, and first magnetic tips 71 which are formed by bending a lower end portion of each first magnetic column 72 inward so as to face the lower end face of the magnet ring 23.

The second soft magnetic member 27 comprises a second magnetic ring 83, six second magnetic columns 82 projecting respectively from the second magnetic ring 83 upward, and second magnetic tips 81 which are formed by bending an upper end portion of each second magnetic column 82 inward so as to face the lower end face of the magnet ring 23.

The first soft magnetic member 26 and the second soft magnetic member 27 are formed respectively, in advance by press molding.

The first magnetic ring 73 and the second magnetic ring 83 are removed from each other in the direction of a rotation axis O of the input shaft 11 such that the first magnetic tips 71 and the second magnetic tips 81 are arranged alternately at equal angular intervals on an identical plane which is orthogonal to the rotation axis of the torsion bar 21.

Referring again to FIG. 4, the stationary magnetic circuit 31 comprises a first magnetic collecting ring 32, a second magnetic collecting ring 33, a first magnetic collecting yoke 34, and a second magnetic collecting yoke 35.

Figure 2:
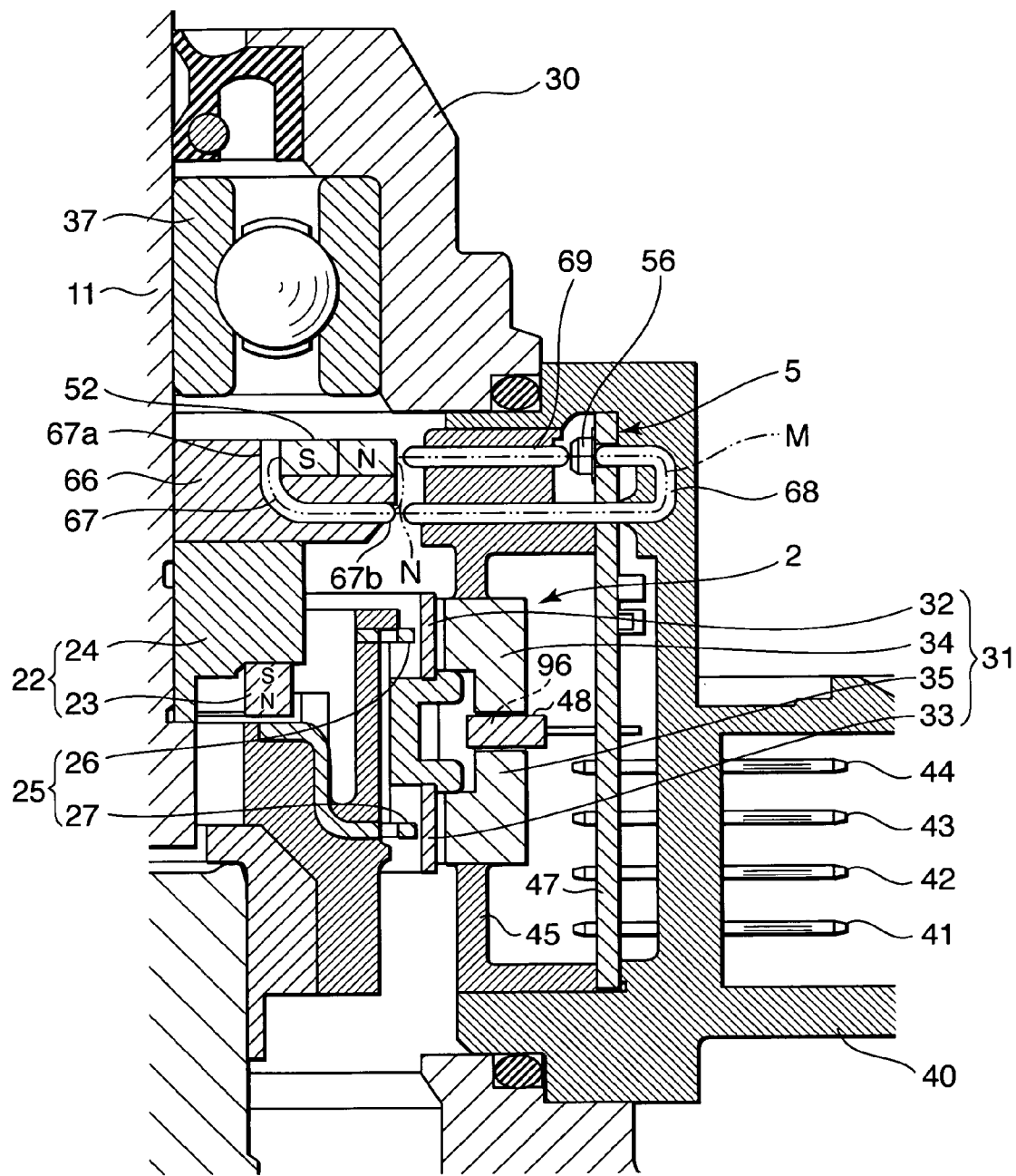
FIG. 2 is an enlarged longitudinal sectional view of essential parts of the power steering device.

Referring to FIG. 2, the first magnetic collecting ring 32 and the second magnetic collecting ring 33 are fixed to an inner circumferential surface of the housing 30 by staking. The first magnetic collecting ring 32 has an inner circumferential surface facing the first magnetic column 72 of the first soft magnetic member 26. The second magnetic collecting ring 33 has an inner circumferential surface facing the second magnetic column 82 of the second soft magnetic member 27.

The first magnetic collecting yoke 34, the second magnetic collecting yoke 35, the magnetic force sensing element 48, and the circuit board 47 are fixed to the sensor holder 40 via a resin-molded body 45. The sensor holder 40 is formed from a resin material and fixed to the metal housing 30 via bolts.

A magnetic gap 96 is formed between first magnetic collecting yoke 34 and the second magnetic collecting yoke 35, and the magnetic force sensing element 48 is provided in the magnetic gap 96.

A hall element is used for the magnetic force sensing element 48. By nature, the hall element outputs a voltage signal in response to a density of the magnetic flux that passes by the element. The magnetic force sensing element 48 outputs a signal corresponding to a magnitude and a direction of a magnetic field formed in the gap 96 between the first magnetic collecting yoke 34 and the second magnetic collecting yoke 35 to the controller 3 via the circuit board 47 and the terminals 41-43. It is preferable to provide the magnetic force sensing element 48 with a circuit that amplifies a signal generated by the hall element, a circuit that compensates for a temperature variation, or a noise filtering circuit.

When the power steering device 1 is in a neutral position in which no torque is exerted on the torsion bar 21, the first magnetic tips 71 of the first soft magnetic member 26 and the second magnetic tips 81 of the second soft magnetic member 27 face the N-poles and the S-poles of the magnet ring 23 evenly, thereby causing a magnetic short circuit between an N-pole and an adjacent S-pole. In this state, the magnetic flux of the magnet ring 23 is not transmitted to the rotating magnetic circuit 25 and the stationary magnetic circuit 31.

When the driver of the vehicle operates the steering wheel, a torque in one direction is input into the torsion bar 21 and the torsion bar 21 undergoes torsional deformation in accordance with the direction of the input torque.

Providing that the rotating magnetic circuit 25 has rotated clockwise in FIG. 6 relative to the magnet ring 23 as a result of the torsional deformation of the torsion bar 21, the total area of the first magnetic tips 71 facing the N-poles increases and the total area of the second magnetic tips 81 facing the S-poles increases.

As a result, the magnetic flux generated by the magnet ring 23 is transmitted to the stationary magnetic circuit 31 via the rotating magnetic circuit 25, and the magnetic force sensing element 48 outputs signals in response to the magnitude and the direction of the magnetic field formed in the magnetic gap 96.

The magnetic path formed through the rotating magnetic circuit 25 and the stationary magnetic circuit 31 in this state starts from the N-poles of the magnet ring 23, and then passes through the first magnetic tips 71, the first magnetic columns 72, the first magnetic ring 73, the first magnetic collecting ring 32, the first magnetic collecting yoke 34, the second magnetic collecting yoke 35, the second magnetic collecting ring 33, the second magnetic ring 83, the second magnetic columns 82, and the second magnetic tips 81 to reach the S-poles of the magnet ring 23.

When the driver of the vehicle operates the steering wheel to input a torque into the torsion bar 21 in the opposite direction, the rotating magnetic circuit 25 rotates counter-clockwise in FIG. 6 relative to the magnet ring 23. In accordance with this operation, the total area of the second magnetic tips 81 facing the N-poles increases and the total area of the first magnetic tips 71 facing the S-poles increases.

As a result, the magnetic flux generated by the magnet ring 23 is transmitted to the stationary magnetic circuit 31 via the rotating magnetic circuit 25, and the magnetic force sensing element 48 outputs signals in response to the magnitude and the direction of the magnetic field formed in the magnetic gaps 96.

The magnetic path formed through the rotating magnetic circuit 25 and the stationary magnetic circuit 31 in this state starts from the N-poles of the magnet ring 23, and then passes through the second magnetic tips 81, the second magnetic columns 82, the second magnetic ring 83, the second magnetic collecting ring 33, the second magnetic collecting yoke 35, the first magnetic collecting yoke 34, the first magnetic collecting ring 32, the first magnetic ring 73, the first magnetic columns 72, and the first magnetic tips 71 to reach the S-poles of the magnet ring 23.

The torsion bar 21 undergoes a torsional deformation in response to the input torque. As the difference between the N-pole facing area and the S-pole facing area of the first magnetic tips 71 and the difference between the S-pole facing area and the N-pole facing area of the second magnetic tips 81 increase, the magnitude of the magnetic field formed in the magnetic gap 96 increases and the output signals from the magnetic force sensing element 48 becomes more prominent.

It should be noted that the number of poles of the magnet ring 23 can be set arbitrarily as long as it is equal to or greater than two. Providing that the area of the first soft magnetic member 26 facing the magnet ring 23 is identical to the area of the second soft magnetic member 27 facing the magnet ring 23, the magnetic flux density transmitted to the magnetic force sensing element 48 is increased by increasing the number of poles of the magnet ring 23.

According to the construction described above, the torque sensor 2 detects a twist angle of the torsion bar 21 from a variation in the density of magnetic flux accompanying the torsional deformation of the torsion bar 21 without contacting the input shaft 11.

The torque sensor 2 described above is identical to a torque sensor disclosed in US2009/0241692 published by the United States Patent and Trademark Office on Oct. 1, 2009.

Next, the structure of the position sensor 5 will be described.

Referring again to FIG. 2, the position sensor 5 is disposed in series with the torque sensor 2 along the rotation axis O in the housing 30.

The position sensor 5 comprises a magnet 52, and a magnetic force sensing element 56 that responds to the magnetic flux led from the magnet 52 in response to a rotation position of the input shaft 11. The position sensor 5 detects a reference rotation position of the input shaft 11, which corresponds to the neutral position, without contacting the input shaft 11.

The magnet 52 is fixed to the input shaft 11 via a magnet retaining member 66 made of a resin.

The magnet 52 is constituted by a bar-magnet made of a ferromagnetic material. The magnet 52 is fitted onto the magnet retaining member 66 in a state where a tip forming an N-pole is directed in a radial direction whereas another tip forming an S-pole is directed towards the rotation axis O.

The magnetic force sensing element 56 is fixed to the circuit board 47 and supported by the housing 30 via the circuit board 47 and the sensor holder 40.

A hall switch is used as the magnetic force sensing element 56. The hall switch selectively outputs an ON signal and an OFF signal to the controller 3 via the circuit board 47 and the terminal 44 depending on a density of magnetic flux passing by the hall switch relative to a reference density.

A hall element that outputs a voltage signal depending on the density of the magnetic flux or a magnetoresistive element may also be used as the magnetic force sensing element 56.

The position sensor 5 responds to the magnetic flux that is generated by the magnet 52 in a state where the input shaft 11 is in the reference rotation position and led to the magnetic force sensing element 56 via the magnetic loop M.

The magnetic loop M is formed by the magnet 52, a magnet side yoke 67, and a sensor side first yoke 68 and a sensor side second yoke 69 that are supported by the sensor holder 40 via a resin-molded body 45.

The magnet 52 and the magnet side yoke 67 are aligned on a straight line as an extension of the sensor side first yoke 68 and the sensor side second yoke 69 when the input shaft 11 is in the reference rotation position, which corresponds to the zero point of the steering angle.

The magnet side yoke 67 is interposed between the magnet 52 and the torque sensor 2 in the direction of the rotation axis O.

The magnet side yoke 67 is formed as a strip-shaped plate made of a soft magnetic material and bent into an L-shape. The magnet side yoke 67 has a base 67a contacting an S-pole of the magnet 52 and a tip 67b exposed to the outside of the magnet retaining member 66 in a radial direction.

The magnetic loop M is formed in the reference rotation position of the input shaft 11 over a narrow gap formed between the tip 67b of the magnet side yoke 67 and a tip of the sensor side first yoke 68 and a narrow gap formed between the N-pole of the magnet 52 and a tip of the sensor side second yoke 69.

The tip 67b of the magnet side yoke 67 is disposed in a position at a predetermined distance from the N-pole of the magnet 52 in a direction of the rotation axis O. The predetermined distance is determined such that the magnetic flux radiated from the N-pole of the magnet 52 causes a short-circuit between the magnet 52 and the tip 67b of the magnet side yoke 67 so as to form a magnetic loop N in a state where the input shaft 11 is in a non-reference rotation position. The non-reference rotation position herein denotes any rotation position of the input shaft 11 other than the reference rotation position.

The gap formed between the tip 67b of the magnet side yoke 67 and the tip of the sensor side first yoke 68 and the gap formed between the N-pole of the magnet 52 and the tip of the sensor side second yoke 69 are set to be shorter than the predetermined distance.

The magnet side yoke 67 is fixed together with the magnet 52 to the magnet retaining member 66 made of a resin. Forming the magnet retaining member 66 from a resin and forming the magnet side yoke 67 from a soft magnetic material in the form of a strip-shaped plate is preferable in terms of decreasing a weight of the power steering device 1. However, it is still possible to form the magnet retaining member 66 from a soft magnetic material.

The sensor side first yoke 68 and the sensor side second yoke 69 are constituted respectively by bar-like members fixed to the sensor holder 40 via the resin-molded body 45 in a radial direction. The sensor side first yoke 68 and the sensor side second yoke 69 constitute the stationary magnetic circuit.

An inner tip of the sensor side second yoke 69 projects towards the magnet retaining member 66 from the resin-molded body 45 whereas an outer tip of the sensor side second yoke 69 faces the magnetic force sensing element 56 in the sensor holder 40.

The sensor side first yoke 68 is bent into a J-shape such that an inner tip of the sensor side first yoke 68 projects towards the magnet retaining member 66 from the resin-molded body 45 whereas an outer tip of the sensor side first yoke 68 faces the magnetic force sensing element 56 in the sensor holder 40 on an opposite side to the sensor side second yoke 69.

When the input shaft 11 is in the reference rotation position, the N-pole of the magnet 52 faces the inner tip of the sensor side second yoke 69 and the tip 67b of the magnet side yoke 67 faces the inner tip of the sensor side first yoke 68, thereby forming the magnetic loop M. The magnetic flux formed through the magnetic loop M causes the magnetic force sensing element 56 to output the ON signal to the controller 3. Since the magnetic flux generated by the magnet 52 is concentrated in the magnetic loop M, magnetic flux leakage from the position sensor 5 to the torque sensor 2 is suppressed to be small.

When, on the other hand, the input shaft 11 is not in the reference rotation position or it is in the non-reference position, the magnet 52 and the magnet side yoke 67 form the magnetic loop N. The magnetic flux radiated from the N-pole of the magnet 52 reaches the S-pole of the same via the magnetic loop N. In this state, the sensor side first yoke 68 and the sensor side second yoke 69 are in a shifted position from the tip 67b of the magnet side yoke 67 and the N-pole of the magnet 52 in a circumferential direction.

The magnetic flux is therefore not transmitted to the sensor side first yoke 68 and the sensor side second yoke 69. As a result, the magnetic flux does not pass by the magnetic force sensing element 56 and the magnetic force sensing element 56 outputs the OFF signal to the controller 3.

In this state also, since the magnetic flux is concentrated in the magnetic loop N, magnetic flux leakage from the position sensor 5 to the torque sensor 2 is suppressed to be small.

According to the power steering device 1 described above, magnetic flux leakage from the position sensor 5 to the torque sensor 2 is suppressed to be small at any time. As a result, the torque sensor 2 and the position sensor 5 can be located close to each other without adversely affecting a detection precision of these sensors. By locating the torque sensor 2 and the position sensor 5 close to each other, the torque sensor 2 and the position sensor 5 can share the common circuit board 47.

As a result, the sensor holder 40 can be made compact and a preferable effect is obtained in terms of downsizing the power steering device 1.

Figure 7:
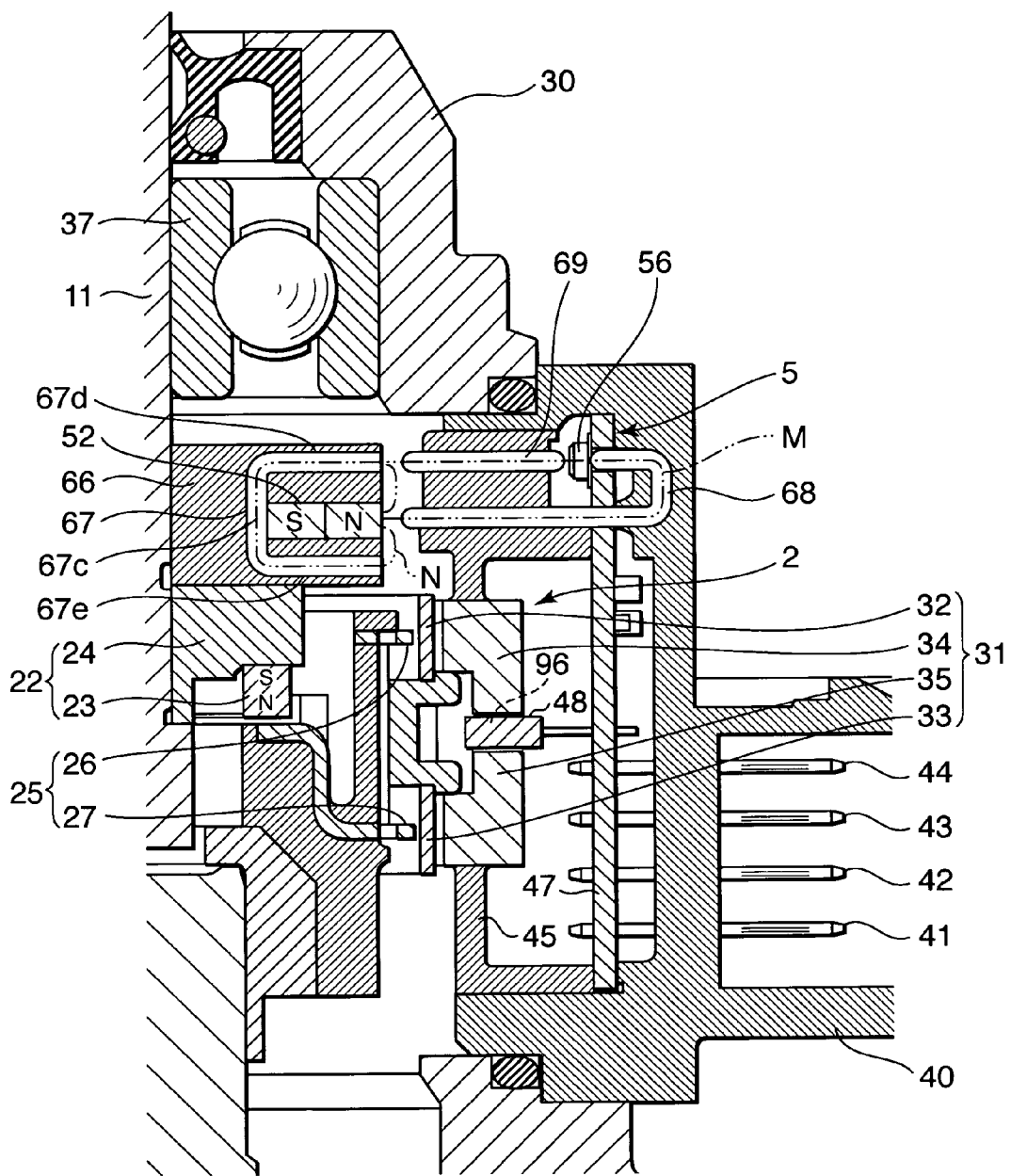
FIG. 7 is similar to FIG. 2 but shows another embodiment of this invention.

Referring to FIG. 7, another embodiment of this invention will be described.

In this embodiment, the magnet side yoke 67 is formed as a strip-shaped plate made of a soft magnetic material and bent into a U-shape. A center portion 67c of the magnet side yoke 67 contacts the S-pole of the magnet 52. An upper tip 67d and a lower tip 67e of the magnet side yoke 67 extend in the radial direction in parallel with the magnet 52 with their tips exposed to the outside of the magnet retaining member 66. The construction of the power steering device excluding the magnet side yoke 67 is identical to the power steering device 1 according to the first embodiment.

In a state where the input shaft 11 is in the reference rotation position, the N-pole of the magnet 52 faces the inner tip of the sensor side first yoke 68 whereas the upper tip 67d of the magnet side yoke 67 faces the inner tip of the sensor side second yoke 69. As a result, the magnet 52, the magnet side yoke 67, the sensor side second yoke 69, and the sensor side first yoke 68 form the magnetic loop M that passes through the magnetic force sensing element 56. The magnetic force sensing element 56 accordingly outputs the ON signal to the controller 3.

In a state where the input shaft 11 is not in the reference rotation position, a short circuit is formed between the N-pole of the magnet 52 and the upper tip 67d of the magnet side yoke 67 as well as between the N-pole of the magnet 52 and the lower tip 67e of the magnet side yoke 67, thereby forming the magnetic loop N.

In this state, since the sensor side first yoke 68 is shifted from the N-pole of the magnet 52 and the sensor side second yoke 69 is shifted from the upper tip 67d of the magnet side yoke 67 in the circumferential direction, the magnetic flux is not led to the sensor side first yoke 68 and the sensor side second yoke 69. Accordingly, magnetic flux passing through the magnetic force sensing element 56 is not formed, and hence, the magnetic force sensing element 56 outputs the OFF signal to the controller 3.

According also to this embodiment, in a state where the input shaft 11 is in the reference rotation position, the magnetic loop M is formed and in a state where the input shaft 11 is in the non-reference rotation position, the magnetic loop N is formed. Magnetic flux leakage from the position sensor 5 to the torque sensor 2 is suppressed to be small at any time when the power steering device operates.

The contents of Tokugan 2009-242166, with a filing date of Oct. 21, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, the magnet 52 is fitted onto the magnet retaining member 66 in the embodiments described above. However, the magnet 52 may be fitted onto the resin-molded body 45. In this case also, providing the yoke 67 in the magnet retaining member 66 prevents the magnetic flux generated by the magnet 52 from leaking to the torque sensor 2.

With respect to the position sensor 5, a plurality of magnets 52 may be fitted onto the input shaft 11 and the magnetic force sensing element 56 may be configured to output the ON signal in the plural rotation positions of the input shaft 11.

The embodiments of this invention in which an exclusive property or privilege is claimed are defined as follows:

What is claimed is:

1. A power steering device for a vehicle, comprising:
an input shaft;
a torque sensor that magnetically detects an input torque input into the input shaft; and
a position sensor that detects a reference rotation position of the input shaft, the position sensor including
a magnet;
a first magnetic path forming member that forms a first magnetic loop for the magnet in the reference rotation position of the input shaft;
a magnetic force sensing element disposed in the first magnetic loop; and
a second magnetic path forming member that forms a second magnetic loop for the magnet in any rotation position of the input shaft other than the reference rotation position;
wherein the second magnetic path forming member includes a magnet side yoke disposed between the magnet and the torque sensor and causing a short-circuit between the N-pole and the S-pole of the magnet via a predetermined gap.

2. The power steering device as defined in claim 1, wherein the first magnetic loop is formed only in the reference rotation position of the input shaft.

3. The power steering device as defined in claim 2, further comprising a housing that supports the input shaft so as to be free to rotate, wherein the magnet is fixed to the input shaft and the magnetic force sensing element is fixed to the housing.

4. A power steering device for a vehicle, comprising:
an input shaft;
a torque sensor that magnetically detects an input torque input into the input shaft; and
a position sensor that detects a reference rotation position of the input shaft, the position sensor including
a magnet;
a first magnetic path forming member that forms a first magnetic loop for the magnet in the reference rotation position of the input shaft;
a magnetic force sensing element disposed in the first magnetic loop;
a second magnetic path forming member that forms a second magnetic loop for the magnet in any rotation position of the input shaft other than the reference rotation position; and
a housing that supports the input shaft so as to be free to rotate, wherein the magnet is fixed to the input shaft and the magnetic force sensing element is fixed to the housing;
wherein the first magnetic loop is formed only in the reference rotation position of the input shaft; and
wherein the torque sensor comprises a magnetic force sensing element, and the power steering device further comprises a common circuit board shared by the magnetic force sensing element of the position sensor and the magnetic force sensing element of the torque sensor for outputting signals.

5. The power steering device as defined in claim 4, further comprising a sensor holder fixed to the housing to accommodate the magnetic force sensing element of the position sensor, the magnetic force sensing element of the torque sensor, and the common circuit board.

6. The power steering device as defined in claim 4, further comprising a magnet retaining member made of a resin to fix the magnet to the input shaft.

7. The power steering device as defined in claim 6, wherein the second magnetic path forming member is fixed to the magnet retaining member.

8. The power steering device as defined in claim 1, wherein the torque sensor and the position sensor are located in series along the input shaft and the magnet includes a bar-magnet arranged in a radial direction with respect to the input shaft.

9. The power steering device as defined in claim 8, wherein the first magnetic path forming member comprises a sensor side first yoke that faces the magnet side yoke in the reference rotation position of the input shaft with a smaller gap than the predetermined gap, and a sensor side second yoke that faces the N-pole or the S-pole of the magnet in the reference rotation position of the input shaft with a smaller gap than the predetermined gap.

10. The power steering device as defined in claim 1, further comprising an output shaft linked to steered wheels of the vehicle, and a torsion bar that connects the input shaft and the output shaft and undertakes a torsional deformation according to the input torque input into the input shaft.

* * * * *